United States Patent
Filippi et al.

(10) Patent No.: US 10,731,614 B2
(45) Date of Patent: Aug. 4, 2020

(54) FUEL INJECTION VALVE WITH AN ANTI BOUNCE DEVICE

(71) Applicant: Continental Automotive GmbH, Hannover (DE)

(72) Inventors: Stefano Filippi, Castel' Anselmo Collesalvetti (IT); Mauro Grandi, Leghorn (IT); Matteo Soriani, Leghorn (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/767,512

(22) PCT Filed: Oct. 10, 2016

(86) PCT No.: PCT/EP2016/074143
§ 371 (c)(1),
(2) Date: Apr. 11, 2018

(87) PCT Pub. No.: WO2017/063977
PCT Pub. Date: Apr. 20, 2017

(65) Prior Publication Data
US 2018/0291851 A1      Oct. 11, 2018

(30) Foreign Application Priority Data

Oct. 15, 2015   (EP) .................................... 15189926

(51) Int. Cl.
*F02M 51/06* (2006.01)
*F16F 1/04* (2006.01)

(52) U.S. Cl.
CPC ...... *F02M 51/0685* (2013.01); *F02M 51/066* (2013.01); *F16F 1/041* (2013.01);
(Continued)

(58) Field of Classification Search
CPC ............. F02M 51/0685; F02M 51/066; F02M 2200/502; F02M 2200/9015;
(Continued)

(56) References Cited

U.S. PATENT DOCUMENTS 5,752,659 A * 5/1998 Moncelle ............... F02M 47/06
                                                                239/124
6,105,879 A * 8/2000 Potz ...................... F02M 61/045
                                                                239/124
(Continued)

FOREIGN PATENT DOCUMENTS

CN        1352730 A     6/2002    ............. F02M 51/06
DE      19849210 A1     4/2000    ............. F02M 51/06
(Continued)

OTHER PUBLICATIONS

Extended European Search Report, Application No. 15189926.7, 8 pages, dated Apr. 25, 2016.
(Continued)

*Primary Examiner* — Hung Q Nguyen
*Assistant Examiner* — Brian P Monahon
(74) *Attorney, Agent, or Firm* — Slayden Grubert Beard PLLC

(57) ABSTRACT

The present disclosure relates to internal combustion engines. Various embodiments may include a fuel injection system for delivering fuel to an internal combustion engine. For example, fuel injector may include a valve body having a cavity; a valve needle with a retainer moving in the cavity; an actuator assembly comprising: a spring element next to the valve needle; an electro-magnetic coil; an armature element movable in the cavity; and an anti-bounce device. The armature element may be between the retainer portion of the valve needle and the anti-bounce device. The anti-bounce device may impose a spring force and a hydraulic (Continued)

force for dampening a movement of the armature element. The anti-bounce device may comprise a spring portion exerting the spring force to close the valve needle and a hydraulic damper portion integrally connected to the spring portion.

9 Claims, 3 Drawing Sheets

(52) U.S. Cl.
CPC ... *F02M 2200/26* (2013.01); *F02M 2200/304* (2013.01); *F02M 2200/502* (2013.01); *F02M 2200/8046* (2013.01); *F02M 2200/9015* (2013.01)

(58) Field of Classification Search
CPC .......... F02M 2200/304; F02M 2200/26; F02M 2200/8046; F16F 1/041
See application file for complete search history.

(56) References Cited

U.S. PATENT DOCUMENTS

| | | | | |
|---|---|---|---|---|
| 6,367,769 | B1 | 4/2002 | Reiter | 251/129.19 |
| 6,675,751 | B1* | 1/2004 | Megli | F01L 9/04 |
| | | | | 123/90.11 |
| 6,745,993 | B2 | 6/2004 | Mueller | 251/50 |
| 6,799,734 | B1* | 10/2004 | Hans | F02M 51/0685 |
| | | | | 239/585.1 |
| 6,817,592 | B2* | 11/2004 | Mianzo | F01L 1/12 |
| | | | | 251/129.16 |
| 2002/0125346 | A1 | 9/2002 | Liskow | 239/585.1 |
| 2003/0047160 | A1* | 3/2003 | Noller | F02M 51/0671 |
| | | | | 123/294 |
| 2003/0146400 | A1* | 8/2003 | Mueller | F02M 51/0685 |
| | | | | 251/48 |
| 2005/0269427 | A1* | 12/2005 | Cho | F02M 51/0682 |
| | | | | 239/533.2 |
| 2005/0274828 | A1* | 12/2005 | Kurz | F02M 45/086 |
| | | | | 239/533.2 |
| 2006/0113503 | A1* | 6/2006 | Mennicken | F02M 51/0635 |
| | | | | 251/129.15 |
| 2007/0215716 | A1* | 9/2007 | Cooke | F02M 51/0603 |
| | | | | 239/102.2 |
| 2009/0200405 | A1* | 8/2009 | Yoshimaru | F02M 51/0685 |
| | | | | 239/585.1 |
| 2012/0312903 | A1* | 12/2012 | Grandi | F02M 51/0685 |
| | | | | 239/585.5 |
| 2012/0318885 | A1* | 12/2012 | Grandi | F02M 51/066 |
| | | | | 239/5 |
| 2013/0277460 | A1* | 10/2013 | Omeri | F02M 51/0685 |
| | | | | 239/585.1 |
| 2014/0084087 | A1* | 3/2014 | Yoshimaru | F02M 51/0614 |
| | | | | 239/585.5 |
| 2014/0352667 | A1* | 12/2014 | Filippi | F02D 41/30 |
| | | | | 123/478 |
| 2015/0204288 | A1* | 7/2015 | Lenzi | F02M 51/061 |
| | | | | 239/585.5 |
| 2015/0219222 | A1* | 8/2015 | Lenzi | F02M 51/0685 |
| | | | | 251/129.01 |
| 2015/0247479 | A1 | 9/2015 | Maeurer et al. | 239/585.2 |
| 2015/0260135 | A1* | 9/2015 | Izzo | F02M 51/061 |
| | | | | 123/482 |
| 2015/0354516 | A1* | 12/2015 | Izzo | F02M 51/0614 |
| | | | | 123/445 |
| 2016/0053731 | A1* | 2/2016 | Mechi | F02M 51/0671 |
| | | | | 239/585.5 |

FOREIGN PATENT DOCUMENTS

| | | | | |
|---|---|---|---|---|
| DE | 102013222613 A1 * | 5/2015 | ......... | F02M 51/0685 |
| EP | 2511515 A1 * | 10/2012 | ......... | F02M 51/0671 |
| EP | 2597296 A1 | 5/2013 | ............. | F02M 51/06 |
| WO | 02/18776 A1 | 3/2002 | ............. | F02M 51/06 |
| WO | 2017/063977 A1 | 4/2017 | ............. | F02M 51/06 |

OTHER PUBLICATIONS

International Search Report and Written Opinion, Application No. PCT/EP2016/074143, 12 pages, dated Jan. 17, 2017.
Korean Office Action, Application No. 2020016641084, 3 pages, dated Mar. 4, 2020.
Chinese Office Action, Application No. 201680060304.4, 16 pages, dated Sep. 26, 2019.

\* cited by examiner

FUEL INJECTION VALVE WITH AN ANTI BOUNCE DEVICE

CROSS-REFERENCE TO RELATED APPLICATIONS

This application is a U.S. National Stage Application of International Application No. PCT/EP2016/074143 filed Oct. 10, 2016, which designates the United States of America, and claims priority to EP Application No. 15189926.7 filed Oct. 15, 2015, the contents of which are hereby incorporated by reference in their entirety.

TECHNICAL FIELD

The present disclosure relates to internal combustion engines. Various embodiments may include a fuel injection system for delivering fuel to an internal combustion engine.

BACKGROUND

The fuel injection system admits a fuel, such as gasoline, into an internal combustion engine. Different types of fuel injection system may be divided generally into port fuel injection and direct injection. Port fuel injection injects fuel into a runner of an air intake manifold that is connected to a cylinder intake port of an engine cylinder. Direct injection injects fuel directly into a combustion chamber of a piston of an engine cylinder, typically during a compression stroke of the piston.

Direct injection typically has the advantage of greater control and greater precision of fuel charge to the combustion chamber under various operating conditions. This then results in better fuel economy as well as lower emissions. Moreover, the direct injection allows higher compression ratios, which enables delivery of higher performance with lower fuel consumption as compared to other fuel injection systems. High-pressure direct injection fuel injectors often use inwardly opening valves in conjunction with solenoid actuation.

SUMMARY

The teachings of the present disclosure may be embodied in a fuel injection valve (1) for a combustion engine comprising: a valve body (12) that comprises a cavity (18) with a fluid inlet portion (24) and with a fluid outlet portion (27), a valve needle (14) movable in the cavity (18), the valve needle (14) comprising a retainer portion (31), and an actuator assembly (5) configured to actuate the valve needle (14). The actuator assembly (5) comprising a spring element (39) next to the valve needle (5), an electro-magnetic coil (35) for generating a magnetic field, and an armature element (33) movable in the cavity (18). The magnetic field interacts with the armature element (33) for moving the armature element (33) to push the retainer portion (31) of the valve needle (5). The fuel injector may further include an anti-bounce device (46), wherein the armature element (33) is provided between the retainer portion (31) of the valve needle (5) and the anti-bounce device (46), the anti-bounce device (46) is operable to effect a spring force and a hydraulic force for dampening a movement of the armature element (33). The fuel injection valve (1) has a closed position and an open position. In the closed position, the spring element (39) pushes the valve needle (5) to a first predetermined location to prevent a fluid from flowing through the fluid outlet portion (27). In the open position, the armature element (33) pushes the valve needle (5) to a second predetermined location to allow the fluid to flow through the fluid outlet portion (27). The anti-bounce device (46) comprises: a spring portion (50) for effecting the spring force and a hydraulic damper portion (53) for effecting the hydraulic force, wherein the hydraulic damper portion (53) is integrally connected to the spring portion (50).

In some embodiments, the hydraulic damper portion (53) has a hydraulic diameter which is at least 30%, in particular at least 50% of the hydraulic diameter of the cavity (18) in the region of the anti-bounce device (46).

In some embodiments, the hydraulic damper portion (53) of the anti-bounce device (46) is provided inside the spring portion (51).

In some embodiments, the hydraulic damper portion (53) comprises: a first disc part (56) and a second disc part (57), and a cylindrical part (59). The cylindrical part (59) is placed between the first disc part (56) and the second disc part (57) and the cylindrical part (59) is integrally connected to the first disc part (57) and to the second disc part (59). An opening (60) extends from a central portion of the first disc part (56) to a central portion of the second disc part (57) and the opening (60) is adapted to receive the valve needle.

In some embodiments, the anti-bounce device (46) comprises or consists of a plastic material.

In some embodiments, the anti-bounce device (46) is a molded part.

In some embodiments, the anti-bounce device (46) is fixed to the valve needle (5).

In some embodiments, the anti-bounce device (46) is fixed to the valve needle (5) by press fit.

In some embodiments, the valve needle (5) comprises a body (15) and the retainer portion (31), which is integrally connected to the body (15).

As another example, a combustion engine may comprise: at least one fuel injection valve (1) according to the description above and at least one combustion chamber for receiving fuel from the corresponding fuel injection valve (1).

As another example, a vehicle may comprise: a plurality of wheels and a combustion engine described above for driving the wheels.

BRIEF DESCRIPTION OF THE DRAWINGS

Various embodiments and developments of the fuel injection valve will become apparent from the exemplary embodiments described below in association with the figures. In the figures.

Figure 1:
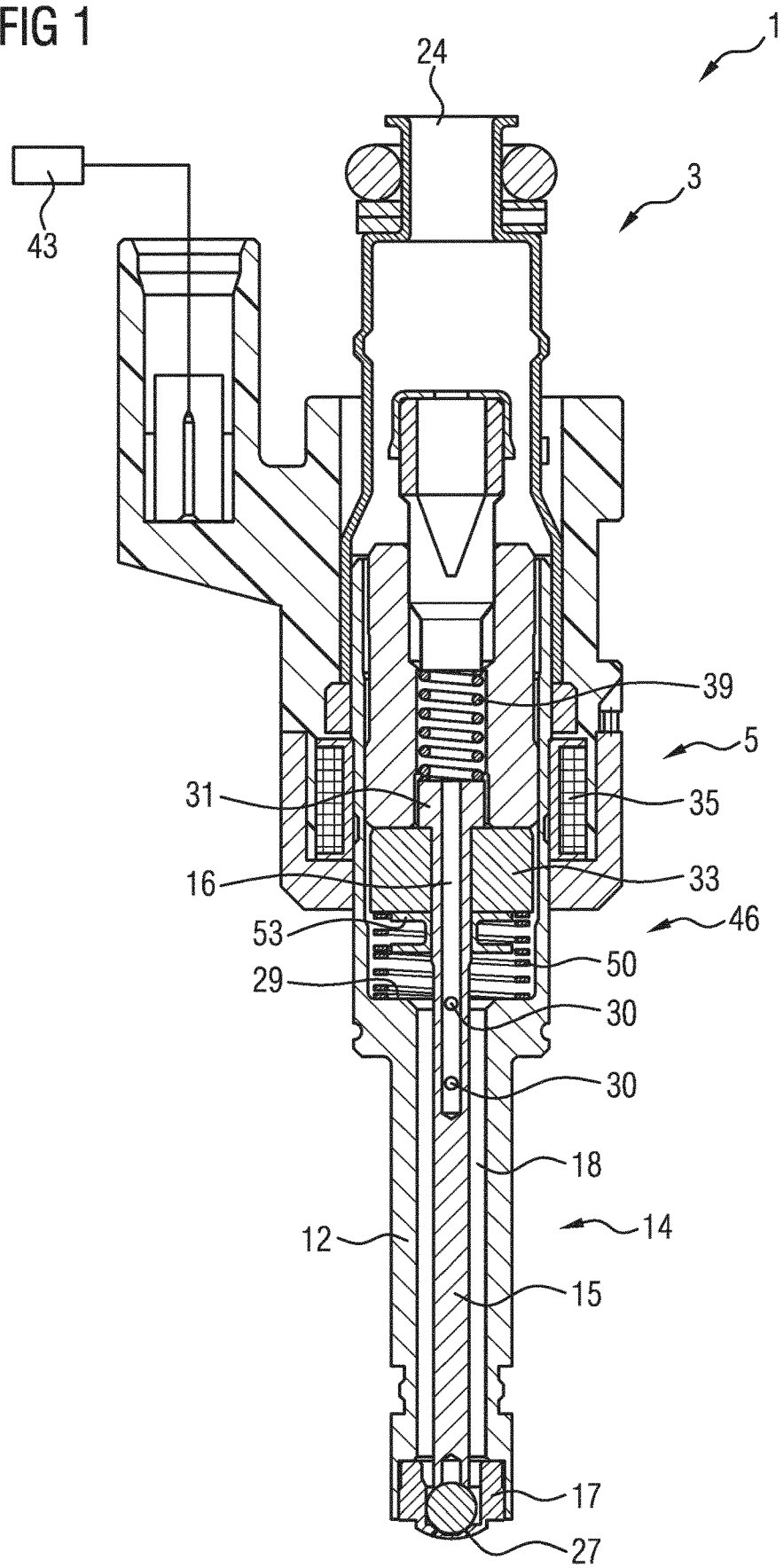
FIG. 1 illustrates a longitudinal section view of a fuel injection valve according to teachings of the present disclosure.

In the following description, details are provided to describe embodiments of the application. It shall be apparent to one skilled in the art, however, that the embodiments may be practiced without such details. Some parts of the various embodiments have similar parts. The similar parts may have the same names or similar part numbers with an alphabet symbol. The description of one similar part also applies by reference to another similar part, where appropriate, thereby reducing repetition of text without limiting the disclosure.

DETAILED DESCRIPTION

A fuel injection valve may be actuated by a solenoid for regulating flow of fuel, such as gasoline, to the combustion engine. The injection valve is also called an injector. The combustion engine burns the fuel for generating mechanical power.

In some embodiments, a fuel injection valve includes a valve body, a valve needle, an actuator assembly, and an anti-bounce device. The valve needle is placed inside the valve body. The actuator assembly is operable to move the valve needle for regulating the flow of fuel through the valve body. The anti-bounce device may be provided for preventing a reopening of the injection valve shortly after a closing of the injection valve.

In some embodiments, the valve body includes an elongated cavity with a fluid inlet portion and with a fluid outlet portion. The fluid inlet portion acts to receive fuel from a fuel rail while the fluid outlet portion serves to release the received fuel, in particular to a combustion chamber of the combustion engine.

The valve needle is placed in the cavity of the valve body and it can move axially with respect to the valve body. The valve needle includes a protruding retainer portion. In some embodiments, the retainer portion protrudes radially with respect to a longitudinal axis of the valve needle—which coincides with a longitudinal axis of the valve body.

The actuator assembly actuates the valve needle such that the valve needle can move axially with respect to the valve body for closing or opening the fuel injection valve. The actuator assembly includes a spring element, an electro-magnetic coil—e.g. the above-mentioned solenoid—and an armature element. The spring element and the armature element are placed inside the cavity of the valve body while the electro-magnetic coil surrounds the valve body.

In some embodiments, the spring element is next to the valve needle. In some embodiments, the spring element abuts the valve needle at an axial end remote from the fluid outlet portion. The spring element is adapted for urging the valve needle to a first predetermined position. To put it differently, the spring element is preloaded and biases the valve needle to the first predetermined position. The first predetermined position is a closing position of the valve needle in which the valve needle rest sealingly on a valve seat of the fuel injection valve for preventing fluid flow out of the fuel injection valve at the fluid outlet portion.

The electro-magnetic coil generates a magnetic field when the electro-magnetic coil is energized by electrical energy from an external electrical source.

The armature element is movable axially with respect to the valve body. In some embodiments, the magnetic field from the electro-magnetic coil interacts with the armature element for moving the armature element to push the retainer portion of the valve needle to a second predetermined position. The valve needle is usually moved away from the fluid outlet portion for opening the injection valve. To put it differently, the armature is mechanically coupled or coupleable to the retainer element—by a form-fit connection—for moving the valve needle away from the closing position. In some embodiments, the armature element is axially displaceable relative to the valve needle.

The anti-bounce device dampens or weakens a movement of the armature element. The anti-bounce device may also be provided for dampening or weakening a movement of the armature element and additionally for dampening a movement of the valve needle. In this way, reopening of the injection valve shortly after the closing of the injection valve may be prevented. Specifically, the armature element is operable to effect a spring force and a hydraulic force for dampening the movement of the armature element. The armature element is provided between the retainer portion of the valve needle and the anti-bounce device.

In use, the fuel injection valve has a closed position and an open position. In the closed position, the spring element acts to move the valve needle to the first predetermined position for closing the fluid outlet portion, thereby preventing a fluid from flowing through the fluid outlet portion. In the open position, the energized armature element acts to move the valve needle to the second predetermined position for allowing the fluid to flow through the fluid outlet portion into the combustion engine.

In some embodiments, the anti-bounce device includes a spring portion and a hydraulic damper portion. In some embodiments, the spring portion is operable to effect the spring force and the hydraulic damper portion is operable to effect the hydraulic force. The hydraulic damper portion is integrally connected to the spring portion. In some embodiments, the anti-bounce device is a one-piece part.

After placing the valve needle in the closing position, the spring portion allows decoupling or separation of the armature element from the retainer portion of the valve needle. The spring portion also places the armature element in a predetermined calibrated position for a subsequent activation of the injector valve. To put it differently, the armature is biased towards and in contact with the retainer element by the spring portion of the anti-bounce device. The anti-bounce device may be axially compliant to enable establishment of an axial gap between the retainer element and the armature, so the armature can move further towards the fluid outlet portion when the valve needle reaches the closing position at the end of the closing transient.

During placement of the injector valve in the closed position, the hydraulic damper portion decelerates the movement of the armature element and, in turn due to the form-fit connection via the retainer element, dampens the movement of the valve needle such that the valve needle is prevented from bouncing when it hits the valve seat. Therefore, the risk of reopening of the fluid outlet portion at the end of the closing transient is particularly small. The bouncing of the valve needle usually occurs immediately after the closing of the fluid outlet portion and lasts for a short period. Put differently, the valve needle, which does not bounce shortly after the closing of the fluid outlet portion, prevents the injection valve from reopening during the closing transient.

Subsequently, when the valve needle has reached the closing position, the armature moves further towards the fluid outlet portion until it is finally pushed back into contact with the retainer element by the spring portion of the anti-bounce device. Also this movement of the armature alone is dampened by the hydraulic force which is effected by the hydraulic damper portion of the anti-bounce device. Therefore, the armature hits the retainer element with particularly small kinetic energy at the end of its travel. The risk that the armature moves the valve needle away from the closing position when it hits the retainer element is thus particularly small.

In some embodiments, an anti-bounce device provided in one piece reduces production cost of the injection valve and reduces number of steps for assembling the injector valve.

In some embodiments, the hydraulic diameter of the hydraulic damper portion is at least 30%, or at least 50% of the hydraulic diameter of the cavity of the valve body in the region of the anti-bounce device. The hydraulic diameter of the hydraulic damper portion is defined by its outer contour in top view along the longitudinal axis. In case of a circular cylindrical shape, the hydraulic diameter corresponds to the geometric diameter, wherein in the present context the space occupied by the valve needle in the respective region has to be subtracted. By means of such dimensions, a increased magnitude of the hydraulic force is achievable. The hydraulic damper portion can be provided inside the spring portion. This may be particularly space-saving.

The hydraulic damper portion can also include a first disc part and a second disc part, a cylindrical part, and an opening. The cylindrical part is placed between the first disc part and the second disc part. In some embodiments, the disc parts project radially beyond the cylindrical part and each of them has an axial dimension which is at most as large as—and in particular smaller than—the axial dimension of the cylindrical part.

The disc parts may have a basic shape of a plate with coplanar, radially extending main surfaces and with a central through-hole representing a section of the opening. The cylindrical part is integrally connected to the first disc part and to the second disc part. In some embodiments, these three parts are embodied as one piece. The opening extends from a central portion of the first disc part to a central portion of the second disc part and it is adapted to receive the valve needle. In this way, the hydraulic damper portion may be at the same time light-weight and cost efficient and have a large hydraulic diameter.

The anti-bounce device can comprise or consist of a plastic material, which is in particular compatible with the fluid in the fuel injection valve. Other non-metallic materials that are in particular compatible with the fluid in the fuel injection valve can also be used to produce the anti-bounce device. By means of the plastic material, the anti-bounce device may be particularly cost-efficient and/or may have particularly large degrees of freedom with respect to its shape. The anti-bounce device can be produced by molding for easy mass production. To put it differently, the anti-bounce device may be a molded part.

The integrated anti-bounce device can be mounted to the valve needle. In some embodiments, it can be fixed to the valve needle. The mounting enables a position of the anti-bounce device with respect to the valve needle to remain stable. It also acts to prevent characteristics of the anti-bounce device from changing over its product operating life.

In some embodiments, the integrated anti-bounce device is mounted to the valve needle by press fit, wherein the integrated anti-bounce device and the valve needle are pushed together and are fastened by frictional forces. The press fit is also called an interference fit.

In some embodiments, the valve needle of the injection valve can include an elongated body—that may also be denoted as a shaft of the valve needle—and the retainer portion, which is integrally connected to the body.

In some embodiments, a combustion engine includes one or more of the above-mentioned fuel injection valves and one or more corresponding combustion chambers. Each injection valve provides fuel to the respective combustion chamber. In some embodiments, a vehicle includes two or more wheels and with the above-mentioned combustion engine for driving the wheels.

In summary, it is believed that the fuel injection valve can be improved by using an integrated anti-bounce device. The integrated anti-bounce device comprises a three-dimensional (3D) component. The 3D component includes a spring element, and a hydraulic damper unit. The hydraulic damper unit includes a hydro-disc. In other words, the integrated anti-bounce device may be provided in one piece. This is different from other anti-bounce devices, which are provided in two different pieces. The integrated anti-bounce device prevents a reopening of the injection valve shortly after a closing of the injection valve.

Uncontrolled reopening can occur especially when high magnetic and hydraulics forces are present under pressurized fluid, which can range from 50 to 200 bars. The injection valve addresses the reopening of the injector using a double order system. The double order system includes a mass of a moving element and parts of the integrated anti-bounce device, namely the spring element, and the hydraulic damper unit. The moving element here refers to an armature and a valve needle. The double order system provides a decoupling of the armature from a retainer portion of the valve needle after a closing of the injector. The closing is accomplished using a ball and seat mechanism.

Parameters of the double order system are adapted for its effectiveness. The parameters include masses of the armature and the valve needle, stiffness of the spring element, and geometry of the spring element, and of the hydraulic damper unit.

The hydraulic damper unit provides a weakening of the movement of the armature and movement of the valve needle, during the closing of the injector valve. This weakening is accomplished using a squish effect. The squish effect refers to fluid being squeezed out of a gap between the armature and the hydro-disc, wherein the squeezing acts against movement of the armature and movement of the valve needle.

A separating distance of the gap and areas of surfaces that form the gap are sized such that the weakening of the movement of the valve needle, under a wide operating pressure of the injector valve, does not result in a reopening of the injector valve shortly after its closing.

The spring unit provides stiffness to support a decoupling of the armature from the retainer portion of the valve needle after a closing of the injector valve. The spring unit also positions the armature for a subsequent activation or cycle of the injector valve.

The integrated anti-bounce device can be produced using plastic or other non-metallic material that is compatibility with used fuel, which can be petrol—i.e. gasoline—or diesel.

In some embodiments, the integrated anti-bounce device is mounted to the valve needle, for an example, via press fit. This has a benefit of providing a stable position and stable characteristics for the injection valve over its operating product lifetime.

In some embodiments, the integrated anti-bounce device reduces cost of the injection valve and reduces steps for assembling the injector valve since the integrated anti-bounce device is provided in one piece.

FIG. 1 shows a longitudinal section view of an improved fuel injection valve 1 according to an exemplary embodiment of the invention. The fuel injection valve 1 includes a valve assembly 3 and an electromagnetic actuator assembly 5. The valve assembly 3 is connected to the electromagnetic actuator assembly 5. The valve assembly 3 includes an elongated valve body 12, a movable valve needle 14, and a valve seat 17. The valve seat 17 is fixedly connected to an end part of the valve body 12. The valve needle 14 is placed inside the valve body 12. One end of the valve needle 14 can touch the valve seat 17 to seal an opening of the valve seat 17.

The valve body 12 includes a fluid inlet portion 24, a fluid outlet portion 27, and an elongated cavity 18 with a step portion 29. The fluid outlet portion 27 is also called an injection opening. The elongated cavity 18 is provided inside the elongated valve body 12, wherein the cavity 18 extends from one end of the valve body 12 to another end of the valve body 12. The cavity 18 also extends along a longitudinal axis of the valve body 12.

The fluid inlet portion 24 is integrally connected to a first end of the cavity 18. The fluid inlet portion 24 has an opening that is adapted for connection with a fuel rail via a pipe. The fuel rail and the pipe are not shown in FIG. 1. The fluid outlet portion 27 is integrally connected to a second end of the cavity 18. The fluid outlet portion 27 comprises the opening of the valve seat 17, which is adapted for attachment to a combustion chamber of an engine cylinder. The combustion chamber is not shown in FIG. 1. The step portion 29 is located approximately near a mid-point between the fluid inlet portion 24 and the fluid outlet portion 27.

The valve needle 14 is placed inside the cavity 18. The valve needle 14 has an elongated valve needle body 15 with a protruding retainer portion 31, which is integrally connected to an end portion of the body 15 such that the retainer portion 31 forms a collar around the end portion. Said end portion may be an axial end portion of the valve needle remote from the fluid outlet portion 27.

The needle body 15 has an internal elongated hollow portion 16. One end of the hollow portion 16 is placed at the end portion of the body 15. The needle body 15 also has several orifices 30, which fluidically connect the hollow portion 16 to the outside of the body 15. The cavity 18 of the valve body 12, the hollow portion 16, the orifices 30, and channels that are placed between the cavity 18 and the valve needle body 15, form a fluidic passageway that extends from the fluid inlet portion 24 to the fluid outlet portion 27.

The electromagnetic actuator assembly 5 includes an armature element 33 with an electro-magnetic coil 35, an anti-bounce device 46, and a main spring 39. The main spring 39 is sometimes also denoted as "spring element" in this disclosure. The armature element 33, the anti-bounce device 46, and the main spring 39 are placed inside the cavity 18 while the electro-magnetic coil 35 surrounds the valve body 12. The anti-bounce device 46 is placed next to the step portion 29. The armature element 33 is placed between the anti-bounce device 46 and the main spring 39. The anti-bounce device 46 is in direct mechanical contact with the step portion 29 and with the armature element 33 at opposite axial ends.

In some embodiments, the step portion 29 is arranged to block the anti-bounce device 46 from travelling towards to the valve seat 17. The armature element 33 has a hollow-cylindrical body. The armature element 33 is movable in the cavity 18 in an axial direction of the cavity 18. One end of the main spring 39 is placed next to the retainer portion 31 and another end of the main spring 39 is blocked by a supporting part. In this way, the main spring 39 is preloaded by and between the retainer portion 31 and the supporting part.

The electro-magnetic coil 35 is electrically connected to an Engine Control Unit (ECU) 43. The electro-magnetic coil 35 is magnetically coupled to the armature element 33. The valve needle 14 is arranged such that the needle body 15 is inserted inside the armature element 33, wherein the needle body 15 is separated from the armature element 33 by a gap. Similarly, the needle body 15 is also inserted inside the anti-bounce device 46 such that the needle body 15 is separated from the anti-bounce device 46 by a gap.

Furthermore, the retainer portion 31 is placed between the main spring 39 and the armature element 33. The armature element has an axial play relative to the needle 5. It is operable to engage in form-fit connection with the retainer portion 31 for moving the needle 5 away from the fluid outlet portion 27 against the bias of the main spring 39.

Figure 2:
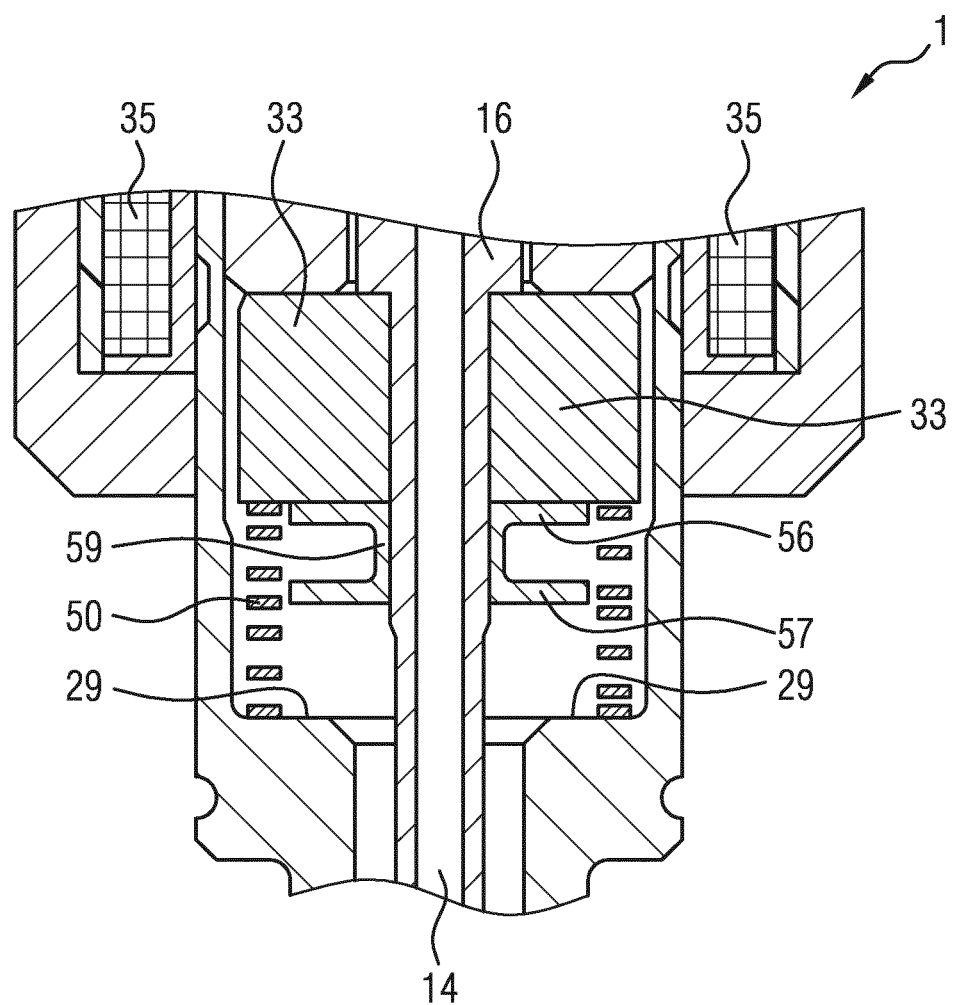
FIG. 2 illustrates an expanded side view of a section of the injection valve of FIG. 1.
Figure 3:
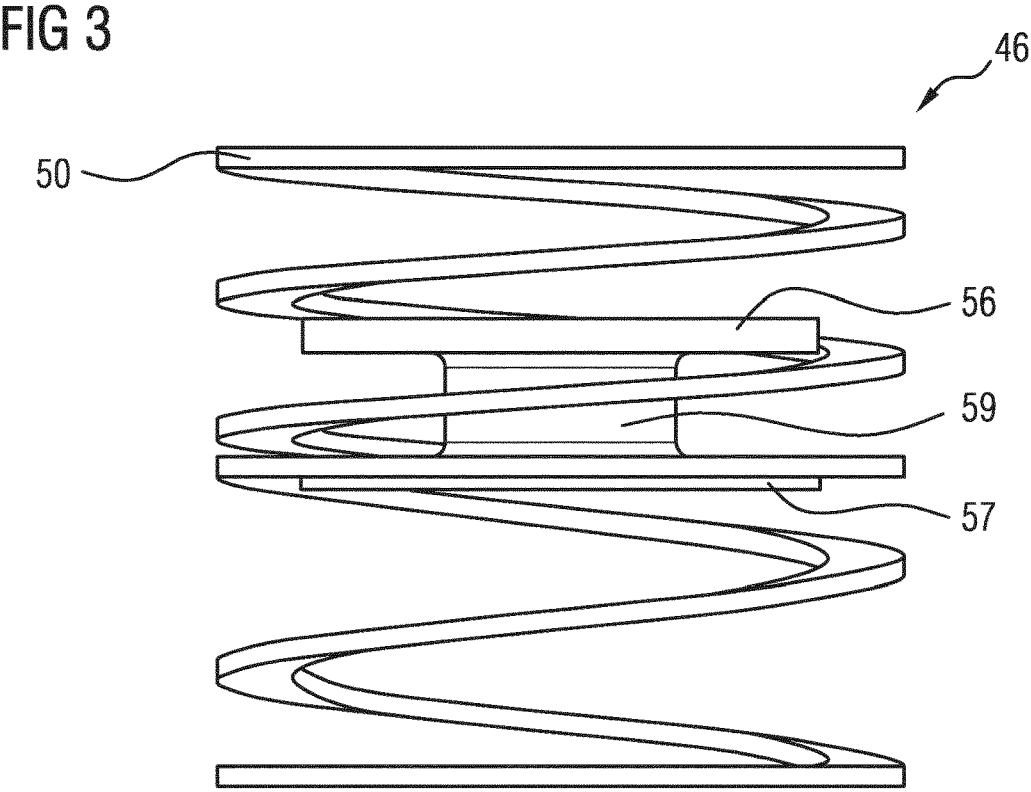
FIG. 3 illustrates a front view of an anti-bounce device of the fuel injection valve of FIG. 1.
Figure 4:
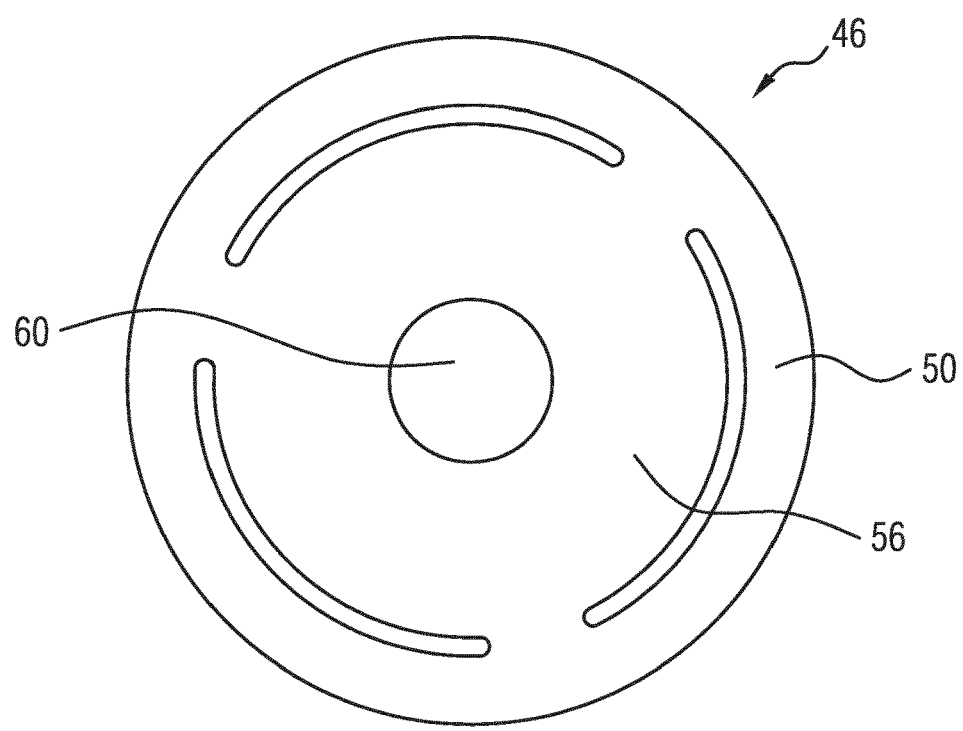
FIG. 4 illustrates a top view of the anti-bounce device of FIG. 3.

The anti-bounce device 46 is better seen in FIGS. 2, 3, and 4. The anti-bounce device 46 includes a spring portion 50 and a hydraulic damper portion 53. The damper portion 53 is placed inside the spring portion 50 and is placed next to a middle part of the spring portion 50. The damper portion 53 is also integrally connected to the spring portion 50 via connecting parts, as seen in FIG. 4. In some embodiments, the spring portion 50 comprises an elongated body with a spiral shape, i.e. a coil spring. An end of the elongated body is placed next to the step portion 29 and is blocked by the step portion 29. Another end of the elongated body abuts the armature element. The spring portion 50 is preloaded so that it biases the armature element 33 away from the step portion 29 and in contact with the retainer portion 31.

In some embodiments, the damper portion 53 includes a first disc part 56, a second disc part 57, a cylindrical part 59, and an opening 60. The cylindrical part 59 is placed between the first disc part 56 and the second disc part 57 so that the damper portion 53 has a cross-section in the general shape of a lying "H". The cylindrical part 59 is integrally connected to the first disc part 56 and to the second disc part 57. The opening 60 extends from a central portion of the first disc part 56 to a central portion of the second disc part 57 and it is adapted to receive the valve needle 14. In some embodiments, the anti-bounce device 46 is made of plastic material.

In use, the main spring 39 exerts a force on the retainer portion 31 in a direction towards the fluid outlet portion 27. The ECU 43 is intended for providing electrical energy to the electro-magnetic coil 35. When the electro-magnetic coil 35 is energized, it generates an electro-magnetic field. In some embodiments, the electro-magnetic coil 35 receives an electrical current from the ECU 43. The electro-magnetic coil 35 then generates a corresponding electro-magnetic field.

The armature element 33 acts to receive the electro-magnetic field from the electro-magnetic coil 35, wherein the electro-magnetic field serves to move the armature element 33 axially, away from the fluid outlet portion 27.

The armature element 33 contacts the retainer portion 31 so that it exerts a force on the retainer portion 31 and pushes the retainer portion 31—and thus the whole valve needle 5—away from the fluid outlet portion 27. The force of the armature element 33 opposes the force of the main spring 39. The anti-bounce device 46 is intended for dampening the movement of the armature element 33, when the armature element 33 is moving towards the fluid outlet portion 27.

The valve needle 14 selectively contacts the valve seat 17 for opening and closing the fluid outlet portion 27. The fluid inlet portion 24 is intended to receive fuel from a fuel rail. The cavity 18 acts as a passageway for the fuel from the fluid inlet portion 24 to travel to the hollow portion 16 of the valve needle 14. The orifices 30 allow the fuel from the hollow portion 16 to flow to channels that are placed between the cavity 18 and the valve needle 14. This fuel then flows to the fluid outlet portion 27. The fluid outlet portion 27 allows the fuel from the channels to flow to a combustion chamber of an engine cylinder.

The injection valve 1 provides an open position and a closed position. In the open position, the main spring 39 exerts a force on the retainer portion 31 that directed towards the fluid outlet portion 27. The ECU 43 provides electrical energy to the electro-magnetic coil 35. The electro-magnetic coil 35 later generates an electro-magnetic field. The armature element 33 then receives the electro-magnetic field from the electro-magnetic coil 35, wherein the electro-magnetic field acts to force the armature element 33 to move away from the fluid outlet portion 27. The moving armature element 33 couples with the retainer portion 31 in a form-fit engagement. The moving armature element 33 contacts with the retainer portion 31 and exerts a force on the retainer portion 31 that is directed away from the fluid outlet portion 27. The valve needle 14 is thus separated from the fluid outlet portion 27 of the fuel injection valve 1. This allows fuel to flow from the fuel rail, to the fluid inlet portion 24, to the cavity 18, to the hollow portion 16 of the valve needle 14, to the orifices 30, to the channels that are placed between the cavity 18 and the valve needle 14, to the fluid outlet portion 27, and to the combustion chamber of the engine cylinder.

In the closed position, the main spring 39 exerts a force on the retainer portion 31 that is directed towards the fluid outlet portion 27 to keep the valve closed. The ECU 43 does not provide electrical energy to the electro-magnetic coil 35. The armature element 33, in turn, does not exert a force on the retainer portion which overcomes the force of the main spring 39. In some embodiments, the spring force of the spring portion 51 of the anti-bounce element 46 is smaller than the spring force of the main spring 39. At the end of the closing transient, the armature element 33 decouples from the retainer portion 31. In other words, the armature element 33 is not mechanically engaged with the retainer portion 31. In detail, the retainer portion 31 being forced by the main spring 39, causes the valve needle 14 to move towards the fluid outlet portion 27, wherein the valve needle 14 contacts with the fluid outlet portion 27 and closes the fluid outlet portion 27. When the valve needle 14 contacts the valve seat 17, it stops moving. The armature element 33, however, moves further towards the fluid outlet portion 27 against the spring force effected by the spring portion 51 and against the hydraulic force effected by the hydraulic damper portion 53 of the anti-bounce device 46. The armature element 33 thus comes to a rest and is subsequently pushed back in contact with the retainer portion 31 by the spring force of the spring portion 51 and against the hydraulic force effected by the hydraulic damper portion 53.

During this closing of the injection valve 1, the anti-bounce device 46 dampens the movement of the armature element 33 and the movement of the valve needle 14 such that the valve needle 14 does not bounce back from the valve seat 17. In detail, the armature element 33 contacts the spring portion 50 of the anti-bounce device 46. The spring portion 50 exerts a force in a direction that is against the movement of the armature element 33 when the armature element 33 moves towards the fluid outlet portion 27. This force opposes the force of the main spring 39 and pushes the armature element 33 towards the retainer portion 31 to contact with the retainer portion 31. This pushing force decreases the speed of the valve needle 14, thereby dampening the movement of the valve needle 14 towards the fluid outlet portion 27.

At the same time, the damper portion 53 of the anti-bounce device 46 acts as a hydraulic damper. For example, fuel is being squeezed out of a narrowing gap between a surface of the armature element 33 and a surface of the first disc part 56 of the damper portion 53 as the armature element 33 moves towards the damper portion 53. In addition, the hydraulic damper portion 53 may be moved through the fuel in the cavity 18 when the spring portion 51 is compressed. This squeezing—and movement, as the case may be—provides a hydraulic force to counter the movement of the armature element 33 and hence decreases the speed of the armature element 33 and the valve needle 14. In other words, the damper portion 53 dampens the movement of the valve needle 14 towards the fluid outlet portion 27. The outer diameter of the hydraulic damper portion 53 is at least 50% of the diameter of the cavity 18 in the region of the hydraulic damper portion 53 in the present embodiment so that a particularly large hydraulic force is effected.

The anti-bounce device 46 is adapted such that the valve needle 14 does not bounce off to a closing of the fluid outlet portion 27. In other words, the fluid outlet portion 27 does not open shortly after a closing of the fluid outlet portion 27. In addition, due to the anti-bounce device 46, the armature element 33 only re-engages with the retainer portion 31 with a particularly small velocity at the end of the closing transient so that it does not lift the valve needle 5 from the valve seat 17 when it hits the retainer portion 31.

In a general sense, the anti-bounce device 46 can be made of different materials, such as plastic, which are compatible with the fuel in the injection valve 1. In some embodiments, the anti-bounce device 46 is fixed to the valve needle 14 by press fit. This fixing provides an anti-bounce device 46 that is mechanically stable. This fuel injection valve 1 with an anti-bounce device 46 has benefit of lower cost and easier production since the anti-bounce device 46 includes a single piece. A molding machine using plastic compound or other types of thermoplastic compounds can produce the anti-bounce device 46.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

The invention claimed is:

1. A fuel injection valve for a combustion engine, the fuel injection valve comprising:
   a valve body having a cavity with a fluid inlet portion and with a fluid outlet portion;
   a valve needle movable in the cavity, the valve needle comprising a retainer portion;
   an actuator assembly to actuate the valve needle, the actuator assembly comprising:
      a spring element next to the valve needle;
      an electro-magnetic coil for generating a magnetic field;
      an armature element movable in the cavity, wherein the magnetic field interacts with the armature element for moving the armature element to push the retainer portion of the valve needle; and
      an anti-bounce device;
   the armature element disposed between the retainer portion of the valve needle and the anti-bounce device;
   the anti-bounce device operable to impose a spring force and a hydraulic force for dampening a movement of the armature element;

wherein, in the closed position of the valve needle, the spring element pushes the valve needle to a first predetermined location to prevent a fluid from flowing through the fluid outlet portion; and in the open position of the valve needle, the armature element pushes the valve needle to a second predetermined location to allow the fluid to flow through the fluid outlet portion; and wherein the anti-bounce device comprises a spring portion exerting the spring force and a hydraulic damper portion integrally connected to the spring portion;

wherein the hydraulic damper portion comprises a spool including:
a first disc part;
a second disc part;
a hollow cylindrical part separating the first disc part from the second disc part and integrally connected to the first disc part and to the second disc part; and
an opening extending from a central portion of the first disc part to a central portion of the second disc part through the cylindrical part, wherein the valve needle extends through the opening.

2. The fuel injection valve according to claim 1, wherein the hydraulic damper portion comprises a hydraulic diameter at least 30% of a hydraulic diameter of the cavity in the region of the anti-bounce device.

3. The fuel injection valve according to claim 1, wherein the hydraulic damper portion of the anti-bounce device is disposed inside the spring portion.

4. The fuel injection valve according to claim 1, wherein the anti-bounce device comprises a plastic material.

5. The fuel injection valve according to claim 1, wherein the anti-bounce device is fixed to the valve needle.

6. The fuel injection valve according to claim 1, wherein the anti-bounce device is fixed to the valve needle by press fit.

7. The fuel injection valve according to claim 1, wherein the retainer portion is integrally connected to the valve needle.

8. A combustion engine comprising: a valve body having a cavity with a fluid inlet portion and with a fluid outlet portion; a valve needle movable in the cavity, the valve needle comprising a retainer portion; an actuator assembly to actuate the valve needle, the actuator assembly comprising: a spring element next to the valve needle; an electro-magnetic coil for generating a magnetic field; and an armature element movable in the cavity, wherein the magnetic field interacts with the armature element for moving the armature element to push the retainer portion of the valve needle; and an anti-bounce device; the armature element disposed between the retainer portion of the valve needle and the anti-bounce device; the anti-bounce device operable to impose a spring force and a hydraulic force for dampening a movement of the armature element; wherein, in the closed position of the valve needle, the spring element pushes the valve needle to a first predetermined location to prevent a fluid from flowing through the fluid outlet portion; and in the open position of the valve needle, the armature element pushes the valve needle to a second predetermined location to allow the fluid to flow through the fluid outlet portion; and wherein the anti-bounce device comprises a spring portion exerting the spring force and a hydraulic damper portion integrally connected to the spring portion; wherein the hydraulic damper portion comprises a spool including: a first disc part; a second disc part; a hollow cylindrical part separating the first disc part from the second disc part and integrally connected to the first disc part and to the second disc part; and an opening extending from a central portion of the first disc part to a central portion of the second disc part through the cylindrical part, wherein the valve needie extends through the opening; and a combustion chamber for receiving fuel from a corresponding fluid outlet portion.

9. A vehicle comprising: a plurality of wheels; a valve body having a cavity with a fluid inlet portion and with a fluid outlet portion; a valve needle movable in the cavity, the valve needle comprising a retainer portion; an actuator assembly to actuate the valve needle, the actuator assembly comprising: a spring element next to the valve needle; an electro-magnetic coil for generating a magnetic field; and an armature element movable in the cavity, wherein the magnetic field interacts with the armature element for moving the armature element to push the retainer portion of the valve needle; and an anti-bounce device; the armature element disposed between the retainer portion of the valve needle and the anti-bounce device; the anti-bounce device operable to impose a spring force and a hydraulic force for dampening a movement of the armature element; wherein, in the dosed position of the valve needle, the spring element pushes the valve needle to a first predetermined location to prevent a fluid from flowing through the fluid outlet portion; and in the open position of the valve needle, the armature element pushes the valve needle to a second predetermined location to allow the fluid to flow through the fluid outlet portion; and wherein the anti-bounce device comprises a spring portion exerting the spring force and a hydraulic damper portion integrally connected to the spring portion; wherein the hydraulic damper portion comprises a spool including: a first disc part; a second disc part; a hollow cylindrical part separating the first disc part from the second disc part and integrally connected to the first disc part and to the second disc part; and an opening extending from a central portion of the first disc part to a central portion of the second disc part through the cylindrical part, wherein the valve needle extends through the opening; and a combustion chamber for receiving fuel from a corresponding fluid outlet portion and driving the plurality of wheels.

* * * * *